UNITED STATES PATENT OFFICE.

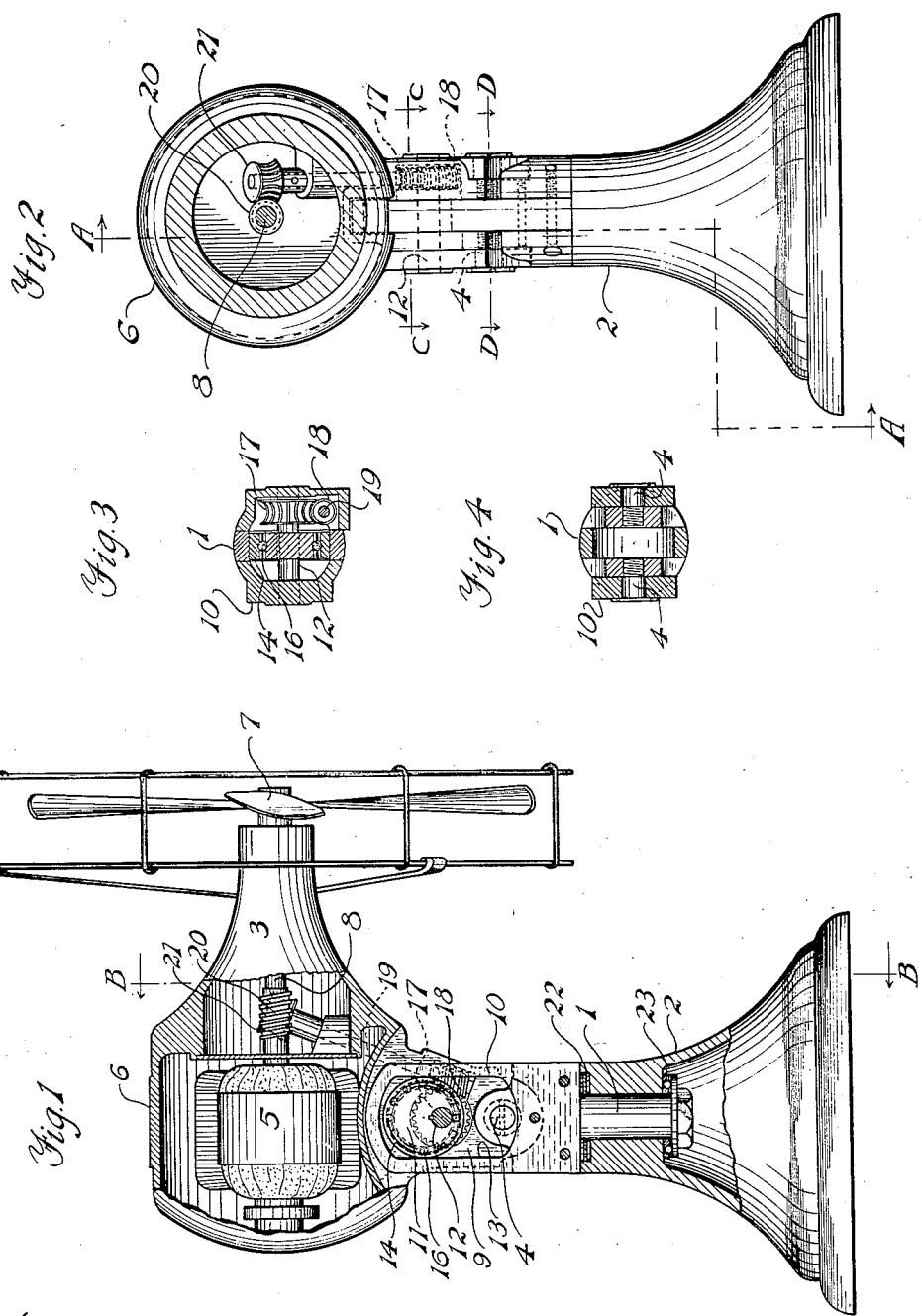

EDWIN P. PHELPS, OF WILMETTE, ILLINOIS, ASSIGNOR TO WILLARD M. McEWEN, OF CHICAGO, ILLINOIS.

OSCILLATING FAN.

1,206,139.  Specification of Letters Patent.  Patented Nov. 28, 1916.

Application filed January 29, 1916. Serial No. 75,006.

*To all whom it may concern:*

Be it known that I, EDWIN P. PHELPS, a citizen of the United States of America, and a resident of Wilmette, county of Cook, and State of Illinois, have invented certain new and useful Improvements in Oscillating Fans, of which the following is a specification.

The main object of this invention is to provide an oscillating fan similar in type to that shown in the copending application of Willard M. McEwen, Serial No. 40,397, filed July 17, 1915, and having improved operating mechanism.

An illustrative embodiment of this invention is shown in the accompanying drawings, in which:

Figure 1 is a sectional elevation taken on the line A—A of Fig. 2. Fig. 2 is a front elevation partly sectional as viewed from the plane of the line B—B of Fig. 1. Fig. 3 is a transverse sectional detail taken on the line C—C of Fig. 2. Fig. 4 is a similar view taken on the line D—D of Fig. 2.

In the construction shown in the drawings, a rotary member or shaft 1 is mounted on a base or support 2 and carries blower mechanism 3 which is pivotally connected thereto by stud shafts 4. The blower mechanism comprises a motor 5 journaled in a housing 6 and connected to rotate the fan 7 carried on the end of the motor shaft 8. The housing 6 is provided with a bifurcated stem 9 which embraces a head or frame 10 on the member or shaft 1, and is pivotally connected to shaft 1 by means of the horizontal stud shafts 4.

The mechanism for tilting the blower mechanism comprises a cam 11 keyed to a shaft 12, journaled on the stem 9, and located in a slot or recess 13 formed in the head 10. The head 10 is integral with the shaft 1 and the slot 13 is elongated in a direction transverse and at right angles to the axis of the stud shafts 4 so as to allow for the reciprocation of the cam. The cam 11 is preferably a circular eccentric embraced by a ring 14 mounted on ball bearings 16. The outside diameter of the ring 14 is substantially equal to the width of the slot 13 and together with the ball bearings 16 provide an antifriction bearing between the cam 11 and the head 10. The rotation of cam 11 is effected by means of a gear 17 also keyed to the shaft 12 and meshing with a worm 18 carried on a shaft 19 which is journaled in the casing 6 and connected by worm 20 and gear 21 to the motor shaft 8.

The shaft 1 is supported on the base 2 by means of antifriction bearings 22 and 23, the bearing 22 being in the form of a plurality of superimposed washers, and the bearing 23 being the usual ball bearing.

The present device employs the same principle of oscillation explained in the hereinbefore mentioned copending application wherein by tilting the axis of rotation of the fan in a vertical plane gyratory forces are brought into action which cause the fan to swing back and forth in a horizontal plane. The tilting is effected by the rotation of the eccentric 11 which, through its engagement with the sides of the slotted head 10 of the member 1, tilts the fan up and down in a vertical plane. The gyratory forces cause a reversal of the direction of the horizontal swinging movement whenever the vertical tilting movement is reversed and the rapidity and angular extent of the horizontal movement depends upon the rapidity of the vertical movement.

Although but one specific embodiment of this invention has been herein shown and described, it will be understood that numerous details of the construction shown may be altered or omitted without departing from the spirit of this invention as defined by the following claims.

I claim:

1. In a blower mechanism, the combination of a support, a member journaled thereon, motor-driven blower mechanism tiltably mounted on said member, a slotted head rigid on said member and disposed at right angles to the axis of the connection of said mechanism and member, an eccentric rotatably supported on said mechanism so as to be located in said slotted head, and gearing connecting said eccentric with the motor of said blower mechanism whereby said eccentric will be rotated to cause the tilting of said blower mechanism.

2. In a blower mechanism, the combination of a support, a member journaled thereon, motor-driven blower mechanism tiltably mounted on said member, a vertically disposed slotted head rigid on said member, a depending bifurcated stem on said mechanism embracing said head and pivotally connected to said member, an eccentric journaled on said stem and located in said slotted head, and gearing connecting said eccentric with the motor of said blower mechanism whereby said eccentric will be rotated to cause the tilting of said blower mechanism.

3. In a blower mechanism, the combination of a support, a member journaled thereon on a vertically disposed axis, motor-driven blower mechanism pivotally connected to said member on a horizontally disposed axis so as to tilt back and forth in a vertical plane, an eccentric rotatably mounted on said mechanism, said member being recessed to receive said eccentric, and gearing connecting said eccentric with the motor of said blower mechanism whereby said eccentric will be rotated to cause said mechanism to tilt back and forth.

Signed at Chicago this 27th day of January, 1916.

EDWIN P. PHELPS.